United States Patent
Mizoguchi

(10) Patent No.: US 11,580,197 B2
(45) Date of Patent: Feb. 14, 2023

(54) ANALYSIS SYSTEM, ANALYSIS METHOD, AND RECORDING MEDIUM

(71) Applicant: NEC CORPORATION, Tokyo (JP)

(72) Inventor: Takehiko Mizoguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 52 days.

(21) Appl. No.: 16/960,642

(22) PCT Filed: Jan. 22, 2018

(86) PCT No.: PCT/JP2018/001732
§ 371 (c)(1),
(2) Date: Jul. 8, 2020

(87) PCT Pub. No.: WO2019/142346
PCT Pub. Date: Jul. 25, 2019

(65) Prior Publication Data
US 2020/0334324 A1 Oct. 22, 2020

(51) Int. Cl.
*G06F 17/18* (2006.01)
(52) U.S. Cl.
CPC .................................... *G06F 17/18* (2013.01)
(58) Field of Classification Search
CPC ....................................................... G06F 17/18
See application file for complete search history.

(56) References Cited

U.S. PATENT DOCUMENTS

2006/0047454 A1* 3/2006 Tamaki .................. G06Q 10/06
702/84

2011/0276828 A1* 11/2011 Tamaki .............. G05B 23/0254
714/E11.029

(Continued)

FOREIGN PATENT DOCUMENTS

| CN | 103930912 A | * | 7/2014 | ............. G06F 17/10 |
| EP | 3118750 A1 | * | 1/2017 | ............. G06F 17/18 |

(Continued)

OTHER PUBLICATIONS

Andrew Y. Ng, "Feature selection, L1 vs. L2 regularization, and rotational invariance", in Proceedings of the 21st International Conference of Machine Learning, 2004, pp. 78-85, ISBN: 1-58113-838-5.

(Continued)

*Primary Examiner* — Eyob Hagos
(74) *Attorney, Agent, or Firm* — Sughrue Mion, PLLC

(57) ABSTRACT

A factor, other than an external factor, having an influence on a state change of a system can be correctly identified even when an external factor having a strong correlation with the state change of the system exists. In an analysis system 1, an external factor identification unit 310 identifies a first explanatory time series among a plurality of explanatory time series. A differential time series generation unit 340 generates a difference time series between a value of an objective time series and a prediction value of the objective time series calculated based on a value of the first explanatory time series. An effect degree calculation unit 420 calculates, based on second explanatory time series among the plurality of explanatory time series and the difference time series, an influence degree of each of the second explanatory time series on a value change of the difference time series.

10 Claims, 17 Drawing Sheets

(56) References Cited

U.S. PATENT DOCUMENTS

2014/0019909 A1* 1/2014 Leonard ................ G06Q 10/04
715/804
2014/0143192 A1* 5/2014 Nagakura .............. G06Q 10/04
706/21

FOREIGN PATENT DOCUMENTS

| JP | 2009-258890 A | 11/2009 | | |
|---|---|---|---|---|
| JP | 2016-102744 A | 6/2016 | | |
| WO | 2015/136586 A1 | 9/2015 | | |
| WO | WO-2015136586 A1 * | 9/2015 | ............... | G07C 3/14 |

OTHER PUBLICATIONS

Leo Breiman, "Random Forests", Machine Learning, 2001, pp. 1 to 32, vol. 45, No. 1, ISSN: 0885-6125.

Jun Kataoka, "Management of seasonal variation", Operations research as a management science, Aug. 1, 1998, pp. 436 to 441, vol. 43, No. 8, ISSN: 0030-3674, particularly, p. 436, left column, line 1 to p. 439, right column, line 17.

International Search Report of PCT/JP2018/001732 dated Mar. 20, 2018 [PCT/ISA/210].

Written Opinion of PCT/JP2018/001732 dated Mar. 20, 2018 [PCT/ISA/237].

* cited by examiner

Fig.2

| ID | EXPLANATORY TIME SERIES | | | | | | | |
|---|---|---|---|---|---|---|---|---|
| | 1 | | 2 | | ... | N | | |
| | TIME | OBSERVATION VALUE | TIME | OBSERVATION VALUE | ... | TIME | FEATURE QUANTITY | |
| TIME SERIES | T0 | 5.5 | T0 | 2.0 | ... | T0 | 7.8 | n |
| | T1 | ... | T1 | ... | ... | T1 | ... | |
| | ... | ... | ... | ... | ... | ... | ... | |
| | Tn | ... | Tn | ... | ... | Tn | ... | |
| EXTERNAL FACTOR INFORMATION | y | | n | | ... | n | | |

Fig.3

OBJECTIVE TIME SERIES

| ID | 0 | |
|---|---|---|
| TIME SERIES | TIME | OBSERVATION VALUE |
| | T0 | 34.0 |
| | T1 | ... |
| | : | ... |
| | Tn | ... |

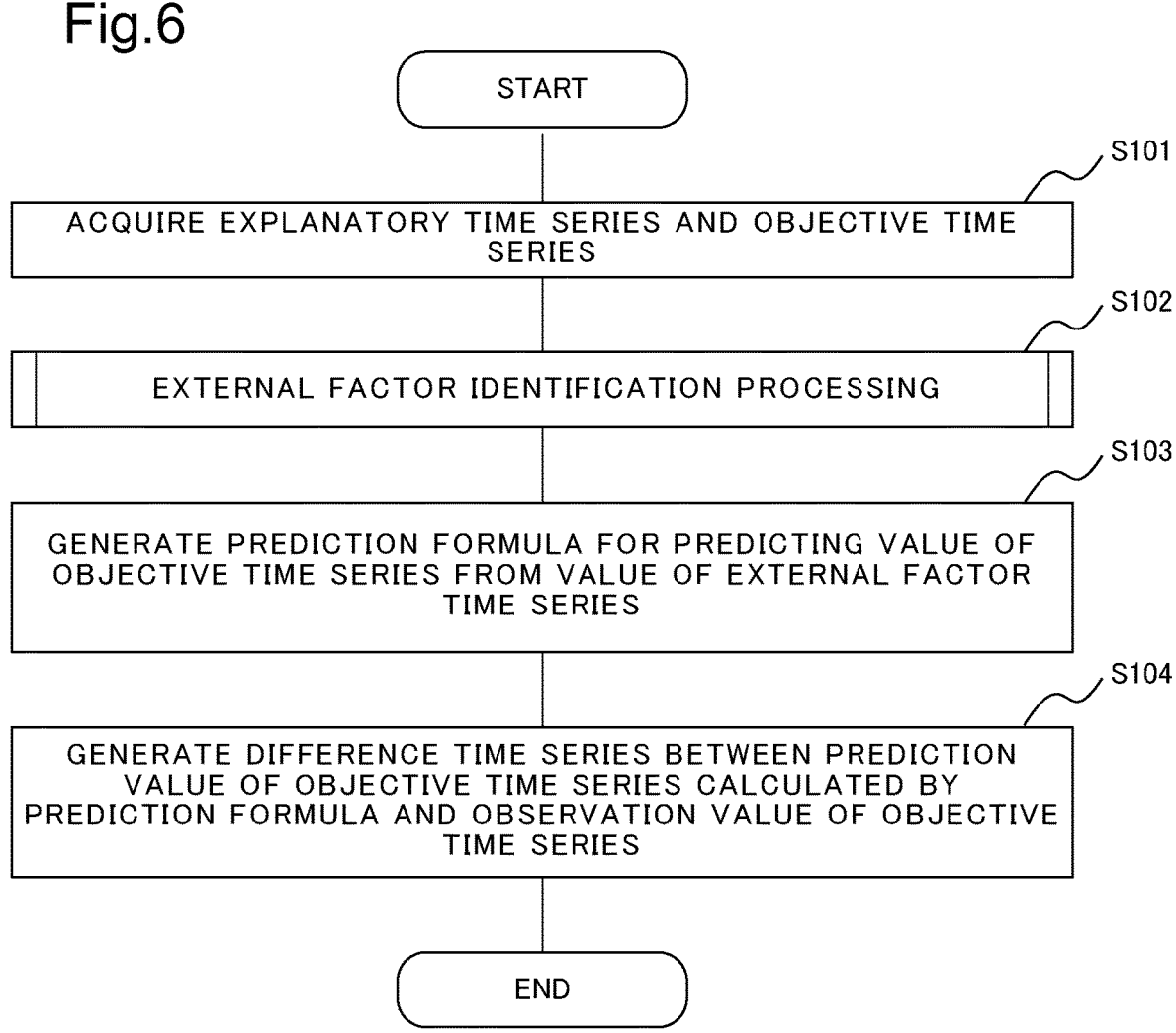

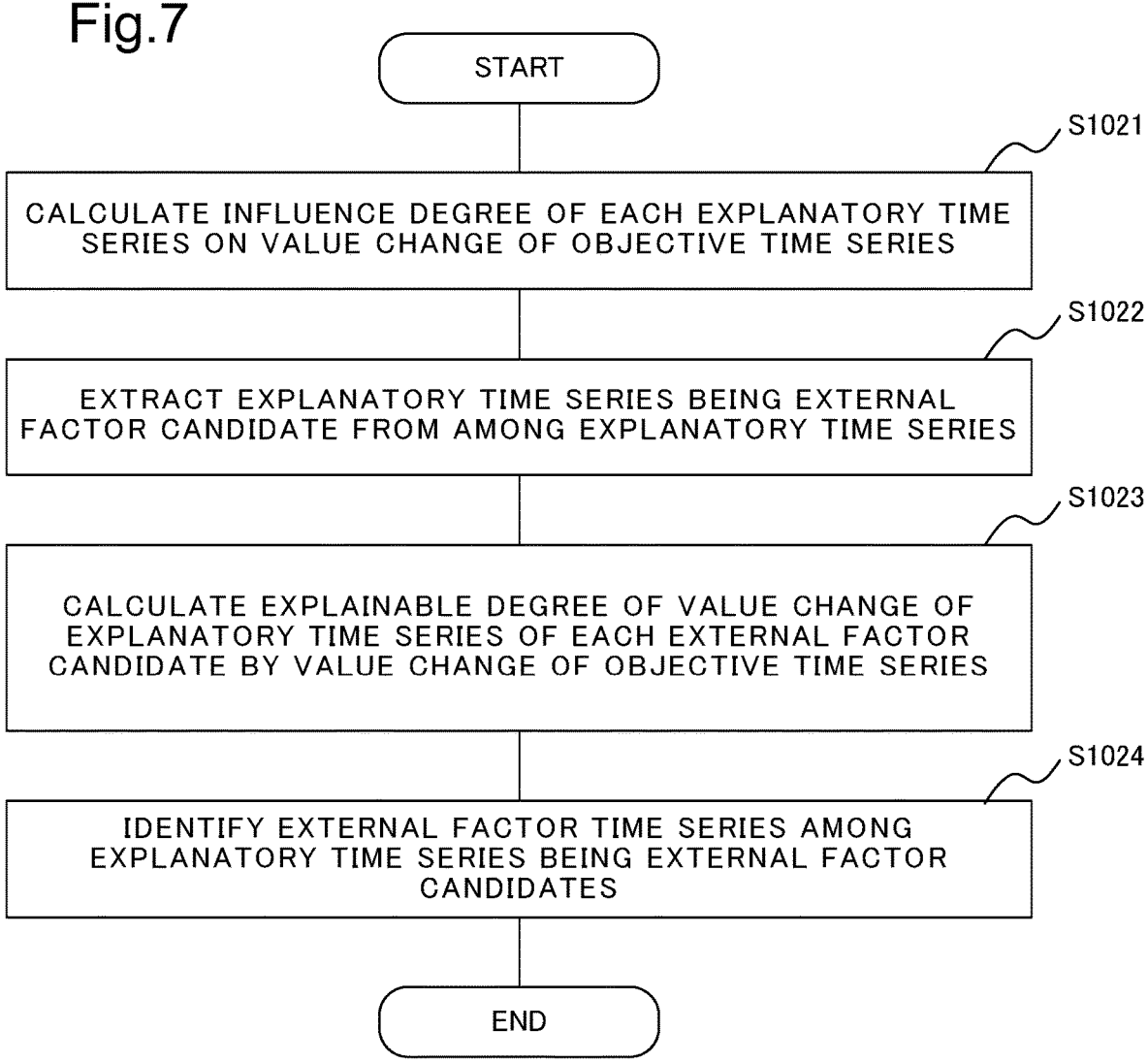

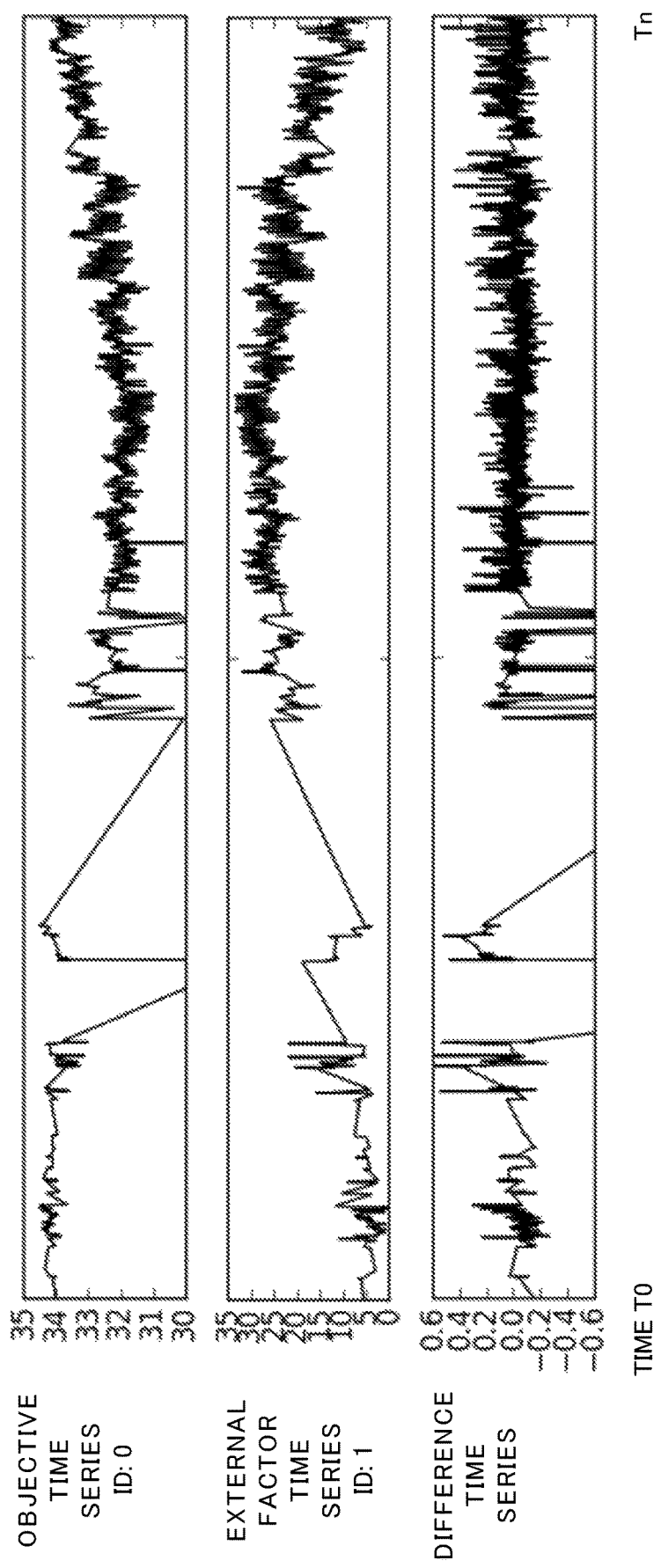

INFLUENCE DEGREE OF EXPLANATORY TIME SERIES

| RANK | ID | INFLUENCE DEGREE |
|---|---|---|
| 1 | 2 | 1.8989 |
| 2 | 9 | 0.4435 |
| 3 | 8 | 0.1766 |
| 4 | 3 | 0.1392 |
| 5 | 7 | 0.0719 |
| : | ... | ... |

| FACTOR CANDIDATE | | |
|---|---|---|
| RANK | ID | INFLUENCE DEGREE |
| 1 | 2 | 1.8989 |
| 2 | 9 | 0.4435 |
| 3 | 8 | 0.1766 |

Fig.16

| ID | 2 | | | | | ... | N | | | | |
|---|---|---|---|---|---|---|---|---|---|---|---|
| KIND OF FEATURE QUANTITY | a | | b | | | ... | a | | b | | |
| LABEL | a::2 | | b::2 | | | ... | a::N | | b::N | | |
| TIME SERIES | TIME | FEATURE QUANTITY | TIME | FEATURE QUANTITY | | ... | TIME | FEATURE QUANTITY | TIME | FEATURE QUANTITY | |
| | T0 | 7.0 | T0 | 4.0 | | ... | T0 | 3.5 | T0 | 8.5 | |
| | T1 | ... | T1 | ... | | ... | T1 | ... | T1 | ... | |
| | : | : | : | : | | ... | : | : | : | : | |
| | Tn | ... | Tn | ... | | ... | Tn | ... | Tn | ... | |

FEATURE TIME SERIES

Fig.17

INFLUENCE DEGREE OF FEATURE TIME SERIES

TECHNIQUE I

| RANK | LABEL | INFLUENCE DEGREE |
|---|---|---|
| 1 | a::37 | 0.773250 |
| 2 | a::13 | 0.605645 |
| 3 | e::37 | 0.267599 |
| 4 | e::13 | 0.068993 |
| 5 | g::13 | 0.000449 |
| 6 | c::37 | 0.000173 |
| 7 | d::37 | 2.98E-05 |
| 8 | b::37 | 1.58E-05 |
| 9 | d::13 | 3.42E-07 |
| 10 | h::37 | 1.31E-07 |
| .. | .. | .. |

TECHNIQUE II

| RANK | LABEL | INFLUENCE DEGREE |
|---|---|---|
| 1 | b::37 | 0.999989 |
| 2 | g::13 | 0.997699 |
| 3 | c::37 | 0.916765 |
| 4 | i::13 | 0.834550 |
| 5 | e::37 | 0.145366 |
| 6 | b::13 | 0.125114 |
| 7 | e::13 | 0.006468 |
| 8 | f::13 | 0.005219 |
| 9 | f::37 | 0.003097 |
| 10 | i::25 | 0.001407 |
| .. | .. | .. |

TECHNIQUE III

| RANK | LABEL | INFLUENCE DEGREE |
|---|---|---|
| 1 | a::13 | 0.950364 |
| 2 | a::37 | 0.878053 |
| 3 | g::13 | 0.544676 |
| 4 | e::37 | 0.527204 |
| 5 | e::13 | 0.526311 |
| 6 | d::37 | 0.506589 |
| 7 | b::37 | 0.423266 |
| 8 | d::13 | 0.414557 |
| 9 | i::13 | 0.321814 |
| 10 | c::37 | 0.317740 |
| .. | .. | .. |

Fig.18

INFLUENCE DEGREE OF EXPLANATORY TIME SERIES

TECHNIQUE I

| RANK | ID | INFLUENCE DEGREE |
|---|---|---|
| 1 | 37 | 1.041067 |
| 2 | 13 | 0.675087 |
| 3 | 38 | 4.04E-07 |
| 4 | 39 | 4.04E-07 |
| 5 | 41 | 4.04E-07 |
| .. | .. | .. |

TECHNIQUE II

| RANK | ID | INFLUENCE DEGREE |
|---|---|---|
| 1 | 37 | 2.066859 |
| 2 | 13 | 1.972295 |
| 3 | 25 | 0.002686 |
| 4 | 32 | 0.002458 |
| 5 | 21 | 0.001990 |
| .. | .. | .. |

TECHNIQUE III

| RANK | ID | INFLUENCE DEGREE |
|---|---|---|
| 1 | 13 | 3.444739 |
| 2 | 37 | 2.966693 |
| 3 | 7 | 0.122848 |
| 4 | 32 | 0.047575 |
| 5 | 27 | 0.042818 |
| .. | .. | .. |

Fig.19 INFLUENCE DEGREE OF EXPLANATORY TIME SERIES (AFTER INTEGRATION)

| RANK | ID | INFLUENCE DEGREE |
|---|---|---|
| 1 | 13 | 6.092121 |
| 2 | 37 | 6.074618 |
| 3 | 7 | 0.122848 |
| 4 | 32 | 0.050033 |
| 5 | 27 | 0.042818 |
| : | : | : |

Fig.20

| FACTOR CANDIDATE | | |
|---|---|---|
| RANK | ID | INFLUENCE DEGREE |
| 1 | 13 | 6.092121 |
| 2 | 37 | 6.074618 |

Fig.21

| PREPROCESSING CANDIDATE |
|---|
| KIND OF FEATURE QUANTITY |
| a |

ANALYSIS SYSTEM, ANALYSIS METHOD, AND RECORDING MEDIUM

CROSS REFERENCE TO RELATED APPLICATIONS

This application is a National Stage of International Application No. PCT/JP2018/001732, filed Jan. 22, 2018.

TECHNICAL FIELD

The present invention relates to an analysis system, an analysis method, and a recording medium.

BACKGROUND ART

As a technique of analyzing a state of a system, a statistical technique such as a regression analysis is widely used. In such a statistical technique, a relation between an objective variable relating to an index of a system and an explanatory variable other than the objective variable among variables relating to a state of the system is clarified, and an explanatory variable having a strong influence on a value change of the objective variable is identified.

For example, when a system being an analysis target is a system including a manufacturing process of a thing, an influence factor having an influence on quality of a manufactured product is identified by applying a statistical technique to observation values of various items of the system being acquired by a sensor. In this case, a multivariate analysis is performed in which an item representing quality is defined as an objective variable, and a plurality of other items are defined as explanatory variables. A user can learn a degree of influence of each explanatory variable (i.e., an influence degree of each explanatory variable) on a value change of the objective variable, based on a contribution ratio of each explanatory variable, a degree of association, and the like that are calculated by the multivariate analysis.

As a technology using such a multivariate analysis, PTL 1 describes a method that segments data, based on nominal scale data included in an explanatory variable, and identifies an influence factor by a multivariate analysis for each segment.

PTL 2 describes a technology of performing, in order to clarify appropriate preprocessing to be performed for an explanatory time series being an analysis target, a factor analysis by use of a feature time series acquired from the explanatory time series. The technology of PTL 2 calculates an influence degree of a feature time series on a value change of an objective time series, and calculates an influence degree of an explanatory time series on the value change of the objective time series, based on the influence degree of the feature time series.

As a related technology, PTL 3 describes a technology of generating an approximation formula of temperature and a water level of a tank, and detecting leakage by use of a difference between a water level predicted from the approximation formula and an actually measured water level. NPL 1 describes that an influence degree of an explanatory variable can be estimated with high accuracy by a method called an L1 regularized logistic regression, when an objective variable is a discrete value. NPL 2 describes a random forest classifier constituting a classifier by using a plurality of decision trees.

CITATION LIST

Patent Literature

[PTL 1] Japanese Unexamined Patent Application Publication No. 2009-258890
[PTL 2] International Publication No. WO2015/136586
[PTL 3] Japanese Unexamined Patent Application Publication No. 2016-102744

Non Patent Literature

[NPL 1] ISBN: 1-58113-838-5, Andrew Y. Ng, "Feature selection, L1 vs. L2 regularization, and rotational invariance" in Proceedings of the 21st International Conference of Machine Learning, pp. 78 to 85, 2004
[NPL 2] ISSN: 0885-6125, Breiman. L, "Random Forests", Machine Learning, Vol. 45, No. 1, pp. 5 to 32, 2001

SUMMARY OF INVENTION

Technical Problem

In a system analysis using the statistical technique described above, a case is conceivable where there exists an external factor having a significantly strong correlation with a state change of a system, such as temperature, weather, a climate, and the like. In this case, an external factor, or a factor associated therewith may be identified as an influence factor for an objective variable, and an explanatory variable other than the external factor, to be originally detected, may not be identified as an influence factor. Thus, it is not possible to take an appropriate action, such as performing adjustment or control of a system, based on the identified factor.

PTLs 1 and 2 described above do not disclose that an influence factor is identified in consideration of such an external factor.

An example object of the present invention is to provide an analysis system, an analysis method, and a recording medium that solve the problem described above, and that can correctly identify a factor, other than an external factor, having an influence on a state change of a system even when an external factor having a strong correlation with the state change of the system exists.

Solution to Problem

An analysis system according to an exemplary aspect of the present invention includes: a identification means for identifying a first explanatory time series among a plurality of explanatory time series; a difference time series generation means for generating a difference time series between a value of an objective time series and a prediction value of the objective time series calculated based on a value of the first explanatory time series; and an influence degree calculation means for calculating, based on one or more second explanatory time series among the plurality of explanatory time series and the difference time series, an influence degree of each of the one or more second explanatory time series on a value change of the difference time series.

An analysis method according to an exemplary aspect of the present invention includes: identifying a first explanatory time series among a plurality of explanatory time series; generating a difference time series between a value of an objective time series and a prediction value of the objective time series calculated based on a value of the first explanatory time series; and calculating, based on one or more second explanatory time series among the plurality of explanatory time series and the difference time series, an influence degree of each of the one or more second explanatory time series on a value change of the difference time series.

A recording medium according to an exemplary aspect of the present invention causes a computer to execute processing of: identifying a first explanatory time series among a plurality of explanatory time series; generating a difference time series between a value of an objective time series and a prediction value of the objective time series calculated based on a value of the first explanatory time series; and calculating, based on one or more second explanatory time series among the plurality of explanatory time series and the difference time series, an influence degree of each of the one or more second explanatory time series on a value change of the difference time series.

Advantageous Effects of Invention

An advantageous effect of the present invention is that a factor, other than an external factor, having an influence on a state change of a system can be correctly identified even when an external factor having a strong correlation with the state change of the system exists.

BRIEF DESCRIPTION OF DRAWINGS

FIG. 2 is a diagram illustrating an example of an explanatory time series according to the first example embodiment.

FIG. 3 is a diagram illustrating an example of an objective time series according to the first example embodiment.

FIG. 6 is a flowchart illustrating external factor reduction processing according to the first example embodiment.

FIG. 7 is a flowchart illustrating details of the external factor identification processing (step S102) according to the first example embodiment.

FIG. 8 is a diagram illustrating an example of a difference time series according to the first example embodiment.

FIG. 9 is a diagram illustrating a graph of a time series according to the first example embodiment.

FIG. 16 is a diagram illustrating an example of a feature time series according to the second example embodiment.

FIG. 17 is a diagram illustrating a calculation example of an influence degree of a feature time series according to the second example embodiment.

FIG. 18 is a diagram illustrating a calculation example of an influence degree of an explanatory time series according to the second example embodiment.

FIG. 19 is a diagram illustrating an integration example of influence degrees of explanatory time series according to the second example embodiment.

FIG. 20 is a diagram illustrating an example of a display screen displayed by a display device 600 according to the second example embodiment.

FIG. 21 is a diagram illustrating another example of a display screen displayed by the display device 600 according to the second example embodiment.

EXAMPLE EMBODIMENT

Example embodiments of the present invention will be described in detail with reference to the drawings. In each of the drawings and each of the example embodiments described in the description, the same number is assigned to a similar component, and description is omitted appropriately.

Each of the example embodiments is described below taking, as an example, a case where a system being an analysis target is a manufacturing system.

First Example Embodiment

First, a configuration according to a first example embodiment is described.

Figure 1:
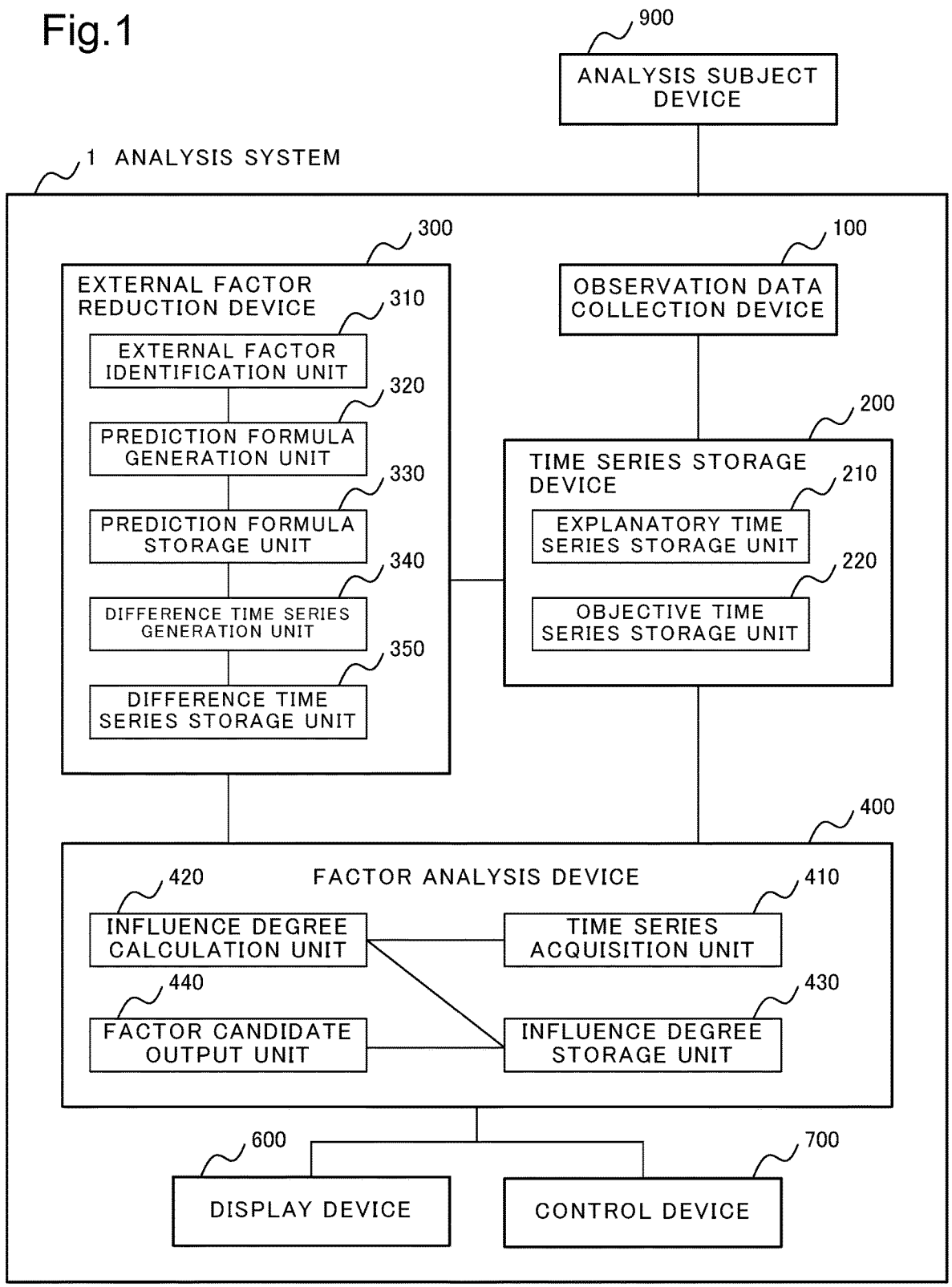
FIG. 1 is a block diagram illustrating a configuration of an analysis system 1 according to a first example embodiment.

FIG. 1 is a block diagram illustrating a configuration of an analysis system 1 according to the first example embodiment. Referring to FIG. 1, the analysis system 1 according to the first example embodiment is connected to an analysis subject device 900 via a network or the like.

The analysis subject device 900 is a device used in a manufacturing process of a manufacturing system. The analysis subject device 900 acquires values of various items in the manufacturing process by, for example, a sensor, and transmits the values to the analysis system 1. As a value of an item in the manufacturing process, the analysis subject device 900 may acquire a value set by a maintenance worker or the like.

Items being targets from which the analysis subject device 900 acquires values are classified into a quality index or a manufacturing condition of a manufactured product.

The quality index is an item indicating quality of a product or evaluation of a product, and is, for example, conductivity, water resistance, heat resistance, a product condition indicating whether a product normally operates, or the like, of a product. A value of each item of the quality index may be a quantitative value such as an integer or a decimal, or may be a qualitative value such as "normal/abnormal".

The manufacturing condition is an item having a possibility of influencing a value of a quality index of a product. The manufacturing condition is further classified into an item of which a value change is directly or indirectly controllable in the analysis subject device 900, and an item of which a value change is not controllable, such as an item depending on an environment or the like of the analysis subject device 900. The item of which a value change is controllable is, for example, temperature or pressure, a gas flow volume, voltage, a property of a material, an amount or ratio of a material, an operation status indicating whether a specific operation is performed, or the like. The item of which a value change is not controllable is, for example, atmospheric temperature, atmospheric pressure, weather, or the like. Hereinafter, such an item of which a value change is not controllable is also described as an external factor. A value of each item of the manufacturing condition may be a quantitative value such as an integer or a decimal, or may be a qualitative value such as "normal/abnormal" or "fair/rainy".

Hereinafter, a value acquired by the analysis subject device 900 is described as an observation value, and data in which observation values are arranged in an order of time are described as a "time series". A time series of an item of a quality index is described as an "objective time series", and a time series of an item of the manufacturing condition is described as an "explanatory time series".

Furthermore, among explanatory time series, an explanatory time series of an item of an external factor is also described as an "external factor time series" or a "first external time series", and an explanatory time series other than the external factor time series is also described as a "second external time series".

FIG. 2 is a diagram illustrating an example of an explanatory time series according to the first example embodiment. FIG. 3 is a diagram illustrating an example of an objective time series according to the first example embodiment. In the example of FIG. 2, with each of the explanatory time series (identifiers (IDs) "1", . . . , and "N"), an observation value is associated for each time, and external factor information indicating whether the time series is an external factor time series is further associated. Herein, the external factor information indicates an external factor time series when "y", and indicates an explanatory time series other than the external factor time series when "n". In the example of FIG. 3 as well, an observation value is associated with an objective time series (ID "0") for each time.

The analysis system 1 includes an observation data collection device 100, a time series storage device 200, an external factor reduction device 300, a factor analysis device 400, a display device 600, and a control device 700.

The observation data collection device 100 collects an observation value from the analysis subject device 900. The observation data collection device 100 saves a time series of the collected observation value in the time series storage device 200. Herein, an item of the quality index (an item of an objective time series) is previously set by a user or the like, and the observation data collection device 100 saves an explanatory time series and an objective time series in an explanatory time series storage unit 210 and an objective time series storage unit 220 of the time series storage device 200, respectively.

The time series storage device 200 stores a time series of an observation value acquired by the observation data collection device 100. The time series storage device 200 includes the explanatory time series storage unit 210 and the objective time series storage unit 220. The explanatory time series storage unit 210 stores an explanatory time series. The objective time series storage unit 220 stores an objective time series.

The external factor reduction device 300 identifies an external factor time series among explanatory time series. The external factor reduction device 300 generates, as a time series in which an influence of an external factor is reduced from an objective time series, a difference time series between a prediction value of an objective time series and an observation value of an objective time series calculated based on an external factor time series. The external factor reduction device 300 includes an external factor identification unit 310 (hereinafter, also described simply as an identification unit), a prediction formula generation unit 320, a prediction formula storage unit 330, a difference time series generation unit 340, and a difference time series storage unit 350.

The external factor identification unit 310 identifies an external factor time series among explanatory time series.

The prediction formula generation unit 320 generates, based on an external factor time series and an objective time series, a prediction formula for predicting a value of the objective time series from a value of the external factor time series.

The prediction formula storage unit 330 stores the prediction formula generated by the prediction formula generation unit 320.

The difference time series generation unit 340 calculates, based on the external factor time series and the prediction formula, a prediction value of the objective time series. The difference time series generation unit 340 generates a difference time series between a prediction value of the objective time series and the observation value of the objective time series stored in the time series storage device 200.

The difference time series storage unit 350 stores the difference time series generated by the difference time series generation unit 340.

The factor analysis device 400 (hereinafter, also described simply as an analysis device) extracts a candidate (hereinafter, also described simply as a factor candidate) of an explanatory time series having an influence on a value change of an objective time series, among explanatory time series other than an external factor time series. The factor analysis device 400 includes a time series acquisition unit 410, an influence degree calculation unit 420, an influence degree storage unit 430, and a factor candidate output unit 440.

The time series acquisition unit 410 acquires explanatory time series other than an external factor time series from the time series storage device 200, and a difference time series from the difference time series storage unit 350 of the external factor reduction device 300.

The influence degree calculation unit 420 calculates an influence degree of an explanatory time series on a value change of a difference time series, based on the explanatory time series other than the external factor time series and the difference time series acquired by the time series acquisition unit 410.

The influence degree storage unit 430 stores the influence degree calculated by the influence degree calculation unit 420.

The factor candidate output unit 440 (hereinafter, also described simply as an output unit) extracts an explanatory time series being a factor candidate, based on the influence degree, and outputs the explanatory time series to the display device 600 and the control device 700.

The display device 600 outputs, to the user or the like, the factor candidate output from the factor analysis device 400.

The control device 700 controls the analysis subject device 900, based on the factor candidate output from the factor analysis device 400.

Each device included in the analysis system 1 may be a computer including a central processing unit (CPU) and a recording medium storing a program, and operating by control based on the program.

Configurations of the external factor reduction device 300 and the factor analysis device 400 implemented on the computer are described below as an example.

Figure 4:
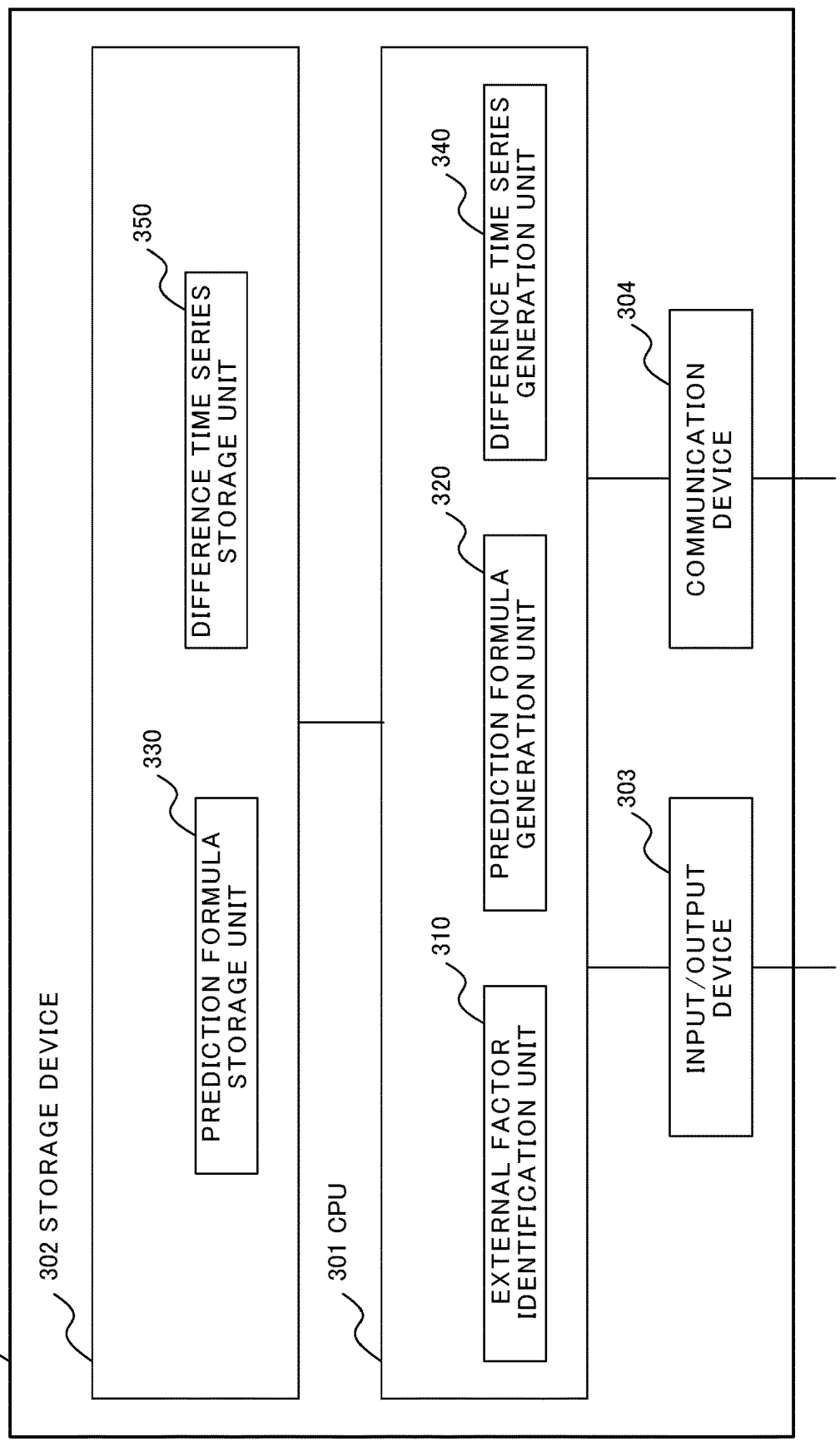
FIG. 4 is a block diagram illustrating a configuration of an external factor reduction device 300 implemented on a computer according to the first example embodiment.

FIG. 4 is a block diagram illustrating a configuration of an external factor reduction device 300 implemented on a computer according to the first example embodiment.

Referring to FIG. 4, the external factor reduction device 300 includes a CPU 301, a storage device 302 (recording medium), an input/output device 303, and a communication device 304. The CPU 301 executes an instruction of a program for implementing the external factor identification unit 310, the prediction formula generation unit 320, and the difference time series generation unit 340. The storage device 302 is, for example, a hard disk, a memory, or the like, and stores data in the prediction formula storage unit 330 and the difference time series storage unit 350. The input/output device 303 is, for example, a keyboard, a display, or the like, and receives, from the user or the like, an input of an execution instruction of external factor reduction processing. The communication device 304 receives an external factor time series and an objective time series from the time series storage device 200. The communication device 304 transmits a difference time series to the factor analysis device 400.

Figure 5:
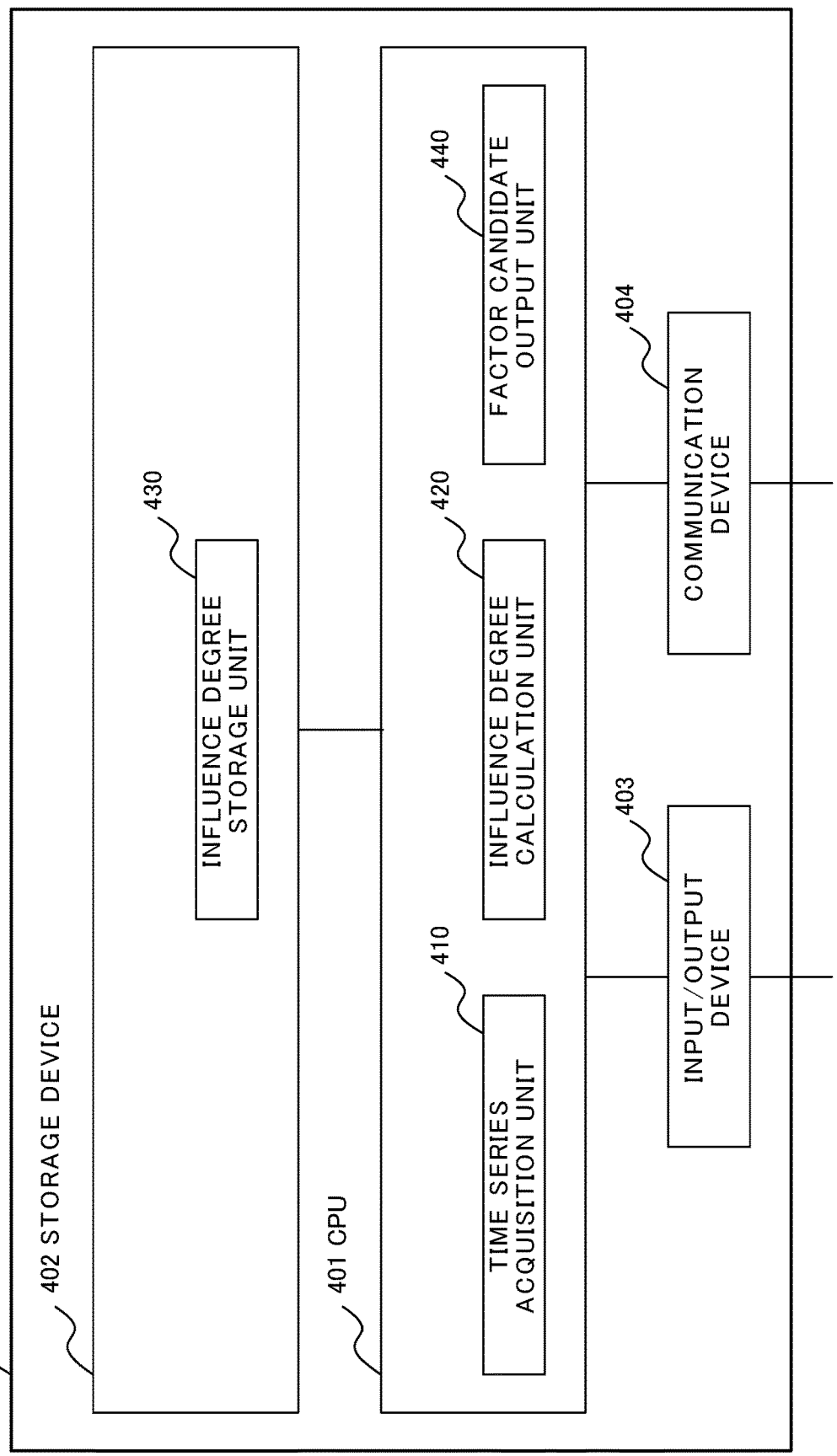
FIG. 5 is a block diagram illustrating a configuration of a factor analysis device 400 implemented on a computer according to the first example embodiment.

FIG. 5 is a block diagram illustrating a configuration of the factor analysis device 400 implemented on a computer according to the first example embodiment.

Referring to FIG. 5, the factor analysis device 400 includes a CPU 401, a storage device 402 (recording medium), an input/output device 403, and a communication device 404. The CPU 401 executes an instruction of a program for implementing the time series acquisition unit 410, the influence degree calculation unit 420, and the factor candidate output unit 440. The storage device 402 stores data in the influence degree storage unit 430. The input/output device 403 receives, from the user or the like, an input of an execution instruction for factor extraction processing. The communication device 404 receives an explanatory time series from the time series storage device 200, and a difference time series from the external factor reduction device 300. The communication device 404 transmits a factor candidate to the display device 600 and the control device 700.

In each device included in the analysis system 1, some or all of a plurality of components may be implemented by a general-purpose or dedicated circuitry or processor, or a combination of these. The circuitry or processor may be constituted of a single chip, or may be constituted of a plurality of chips connected via a bus. Some or all of a plurality of components may be implemented by a combination of the above-described circuitry or the like and a program. When some or all of a plurality of components are implemented by a plurality of information processing devices, circuitries, or the like, the plurality of information processing devices, circuitries, or the like may be concentratedly arranged or may be distributedly arranged. For example, the information processing devices, circuitries, or the like may be implemented as a form such as a client-and-server system, a cloud computing system, or the like in which each of the devices, circuitries, or the like is connected via a communication network.

Components of a plurality of devices included in the analysis system 1 may be implemented in one physical device. For example, components of the observation data collection device 100, the time series storage device 200, the external factor reduction device 300, and the factor analysis device 400 may be implemented on one computer.

Next, an operation of the analysis system 1 according to the first example embodiment is described.

Herein, it is assumed that an explanatory time series and an objective time series in an analysis target period as in FIGS. 2 and 3 collected by the observation data collection device 100 are saved in the time series storage device 200. It is assumed that, in an initial state, "n" is set in external factor information for all explanatory time series in FIG. 2.

First, external factor reduction processing according to the first example embodiment is described.

The external factor reduction processing is processing of identifying an external factor time series among explanatory time series, and generating, as a time series in which an influence of an external factor is reduced from an objective time series, a difference time series between a prediction value of an objective time series and an observation value of an objective time series calculated based on an external factor time series. The user or the like instructs the external factor reduction device 300 to execute the external factor reduction processing prior to execution of the factor extraction processing, for example, when an abnormality is found in a value of a quality index.

FIG. 6 is a flowchart illustrating the external factor reduction processing according to the first example embodiment.

First, the external factor identification unit 310 of the external factor reduction device 300 acquires an explanatory time series and an objective time series from the time series storage device 200 (step S101).

The external factor identification unit 310 identifies an external factor time series among the explanatory time series by external factor identification processing (step S102).

As described above, an external factor is an item in a manufacturing condition of which a value change is not controllable, such as atmospheric temperature, atmospheric pressure, weather, or the like. Herein, an external factor time series is identified as follows, based on a premise that "an external factor influences a value change of an objective time series, but a value change of an objective time series does not influence an external factor".

FIG. 7 is a flowchart illustrating details of the external factor identification processing (step S102) according to the first example embodiment.

The external factor identification unit 310 calculates, for each of the explanatory time series, an influence degree on a value change of an objective time series (step S1021). Herein, the external factor identification unit 310 calculates an influence degree by use of, for example, a multivariate analysis technique. The external factor identification unit 310 executes a multivariate analysis in which an objective time series is defined as an objective variable, and an explanatory time series is defined as an explanatory variable. As long as an influence degree of an explanatory variable on a value change of an objective variable can be calculated, the external factor identification unit 310 may use any technique as a multivariate analysis technique. For example, when an objective time series is quantitative data, the external factor identification unit 310 can use a multiple regression analysis as a multivariate analysis. When the multiple regression analysis is used, a reciprocal number of a p-value or a t-value calculated for each explanatory variable can be regarded as an influence degree. When an objective time series is qualitative data, a logistic regression analysis can be used as a multivariate analysis. When the logistic regression analysis is used, a reciprocal number of a p-value or a Wald statistic calculated for each explanatory variable can be regarded as an influence degree, for example.

For example, the external factor identification unit 310 executes a multivariate analysis in which an objective time series (ID "0") in FIG. 3 is defined as an objective variable, and explanatory time series (IDs "1", . . . , and "N") in FIG. 2 are defined as explanatory variables.

The external factor identification unit 310 extracts, based on the influence degree calculated in step S1021, an explanatory time series being an external factor candidate from among explanatory time series (step S1022). Herein, the external factor identification unit 310 extracts, as an explanatory time series being an external factor candidate, a time series of which an influence degree is equal to or more than a predetermined value from among explanatory time series, for example.

For example, when an influence degree calculated for each of the explanatory time series having the IDs "1" and "2" is equal to or more than the predetermined value, the external factor identification unit 310 extracts each of the explanatory time series having the IDs "1" and "2" as an explanatory time series being an external factor candidate.

The external factor identification unit 310 calculates, for each of the explanatory time series being an external factor candidate, an explainable degree of a value change of an explanatory time series by a value change of an objective time series (step S1023). Herein, the external factor identification unit 310 approximates a relation between an objective time series and the explanatory time series being the external factor candidate by a predetermined time series model for estimating an explanatory time series from an objective time series, for example. As long as the external factor identification unit 310 can estimate an explanatory time series being an external factor candidate from an objective time series, the external factor identification unit 310 may use any time series model. For example, when an auto-regressive exogeneous (ARX) model is assumed as a predetermined time series model, the external factor identification unit 310 determines a value of a parameter of the ARX model from an objective time series and an explanatory time series being an external factor candidate.

The external factor identification unit 310 calculates, for each of the time series being an external factor candidate, a value of an index indicating goodness of application of the time series model as the explainable degree described above. As such an index, a square error or an adaptation degree of an estimate value when an explanatory time series being an external factor candidate is estimated from an objective time series by the time series model can be used, for example.

For example, the external factor identification unit 310 determines a parameter of an ARX model for estimating each of the explanatory time series (the IDs "1" and "2") being an external factor candidate from an objective time series (the ID "0"), and calculates an adaptation degree of the ARX model.

The external factor identification unit 310 identifies, based on the explainable degree calculated in step S1023, an external factor time series among explanatory time series being external factor candidates (step S1024). Herein, the external factor identification unit 310 identifies, as an external factor time series, an explanatory time series of which an explainable degree is less than a predetermined value among explanatory time series being external factor candidates, for example. The external factor identification unit 310 sets "y" in external factor information of an explanatory time series extracted as an external factor time series in the explanatory time series storage unit 210.

For example, when an adaptation degree calculated for an explanatory time series having the ID "1" is less than a predetermined value, the external factor identification unit 310 identifies the explanatory time series as an external factor time series. The external factor identification unit 310 sets "y" in external factor information of an explanatory time series having the ID "1", as illustrated in FIG. 2.

It is considered that the external factor time series extracted in this way satisfies the above-described premise that "an external factor influences a value change of an objective time series, but a value change of an objective time series does not influence an external factor".

The external factor identification unit 310 may identify, as an external factor time series, an explanatory time series designated by the user or the like among explanatory time series stored in the time series storage device 200.

Next, the prediction formula generation unit 320 generates a prediction formula for predicting a value of an objective time series from a value of an external factor time series (step S103). Herein, the prediction formula generation unit 320 generates a prediction formula by executing, for example, a regression analysis in which an objective time series is defined as an objective variable, and an external factor time series is defined as an explanatory variable. As long as a prediction formula for predicting a value of an objective time series from a value of an external factor time series can be generated, the prediction formula generation unit 320 may use any technique as a technique of a regression analysis. For example, the prediction formula generation unit 320 generates a prediction formula in a form of $Y(t)=aX(t)+b$ by a linear regression analysis. Herein, $Y(t)$ is a prediction value of an objective time series at a time t, $X(t)$ is a value of an external factor time series at the time t, and a and b are parameters. The prediction formula generation unit 320 saves the generated prediction formula in the prediction formula storage unit 330.

The difference time series generation unit 340 generates a difference time series between a prediction value of the objective time series calculated by the prediction formula and an observation value of the objective time series (step S104). Herein, the difference time series generation unit 340 calculates a prediction value of the objective time series at each time in the analysis target period by substituting a value of an external factor time series for the prediction formula stored in the prediction formula storage unit 330. The difference time series generation unit 340 calculates a difference between the calculated prediction value and the observation value at each time in the analysis target period. The difference time series generation unit 340 saves data in which the calculated differences are arranged in an order of time, in the difference time series storage unit 350 as a difference time series.

FIG. 8 is a diagram illustrating an example of a difference time series according to the first example embodiment. For example, the difference time series generation unit 340 generates a difference time series as in FIG. 8, by use of the external factor time series (the ID "1") in FIG. 2 and the objective time series (the ID "0") in FIG. 3.

FIG. 9 is a diagram illustrating a graph of a time series according to the first example embodiment. In the graph of FIG. 9, changes with time of the objective time series (the ID "0"), the external factor time series (the ID "1"), and the difference time series are illustrated.

It is considered that the difference time series acquired in this way is a time series in which an influence of an external factor is reduced from an objective time series.

Next, the factor extraction processing according to the first example embodiment is described.

The factor extraction processing is processing of extracting an explanatory time series being a factor candidate from explanatory time series other than an external factor time series among explanatory time series. For example, when the external factor reduction processing by the external factor reduction device 300 ends, the user or the like instructs the factor analysis device 400 to execute the factor extraction processing.

Figures 10, 11:
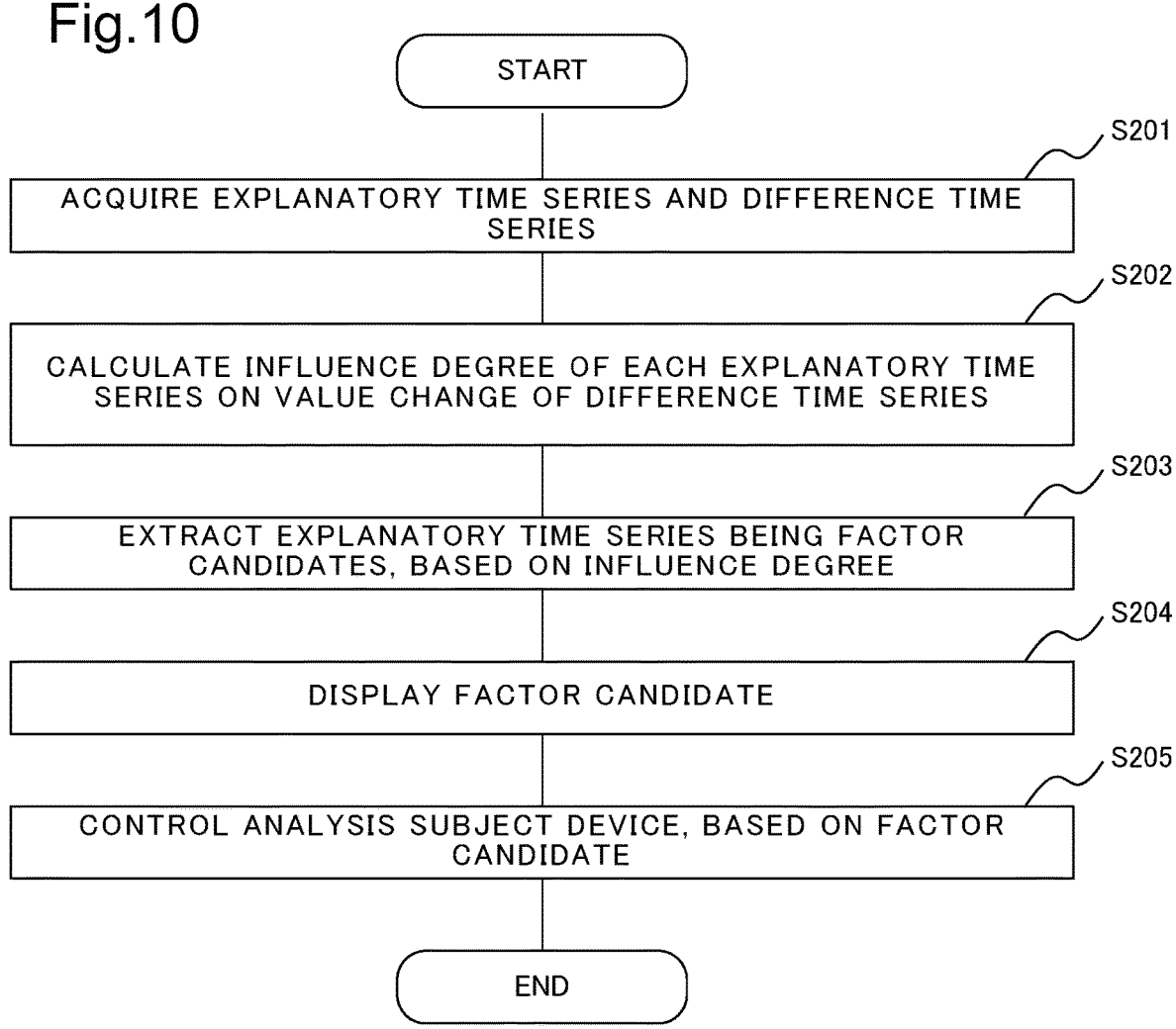
FIG. 10 is a flowchart illustrating factor extraction processing according to the first example embodiment.
FIG. 11 is a diagram illustrating a calculation example of an influence degree according to the first example embodiment.

FIG. 10 is a flowchart illustrating factor extraction processing according to the first example embodiment.

First, the time series acquisition unit 410 of the factor analysis device 400 acquires explanatory time series other than an external factor time series from the time series storage device 200, and acquires a difference time series from the external factor reduction device 300 (step S201).

The influence degree calculation unit 420 calculates, for each of the explanatory time series other than the external factor time series, an influence degree on a value change of the difference time series (step S202). Herein, the influence degree calculation unit 420 calculates an influence degree by use of, for example, a multivariate analysis technique similar to the multivariate analysis technique used in the external factor identification processing described above. The influence degree calculation unit 420 executes a multivariate analysis in which a difference time series is defined as an objective variable, and an explanatory time series other than an external factor time series is defined as an explanatory variable. The influence degree calculation unit 420 stores a calculation result of the influence degree in the influence degree storage unit 430.

FIG. 11 is a diagram illustrating a calculation example of an influence degree according to the first example embodiment. In the example of FIG. 11, IDs of explanatory time series are illustrated in descending order of calculated influence degrees. For example, the influence degree calculation unit 420 executes a multivariate analysis in which a difference time series in FIG. 8 is defined as an objective variable, and explanatory time series (the IDs "2", . . . , and "N") other than an external factor time series in FIG. 2 are defined as explanatory variables, and calculates an influence degree as in FIG. 11.

The influence degree calculation unit 420 may calculate influence degrees by use of each of a plurality of multivariate analysis techniques, and integrate the calculated influence degrees. In this case, for example, the influence degree calculation unit 420 may normalize the influence degree calculated in each of the multivariate analysis techniques in such a way that a maximum value becomes 1 and a minimum value becomes 0, and calculate a sum or an average of the normalized influence degrees. When a sum of influence degrees is calculated, a simple sum of influence degrees for each of the multivariate analysis techniques may be calculated, or a sum of influence degrees weighted by a predetermined weight for each of the multivariate analysis techniques may be calculated.

The factor candidate output unit 440 extracts, based on the influence degree, explanatory time series being factor candidates from the influence degree storage unit 430, and outputs the explanatory time series to the display device 600 and the control device 700 (step S203). Herein, for example, the factor candidate output unit 440 extracts, as explanatory time series being factor candidates, a predetermined number of explanatory time series in descending order of influence degrees, and output IDs of the explanatory time series together with the influence degrees. The factor candidate output unit 440 may extract an explanatory time series of which an influence degree is equal to or more than a predetermined value.

For example, the factor candidate output unit 440 extracts the IDs "2", "9", and "8" of three explanatory time series from the calculation result of the influence degree in FIG. 11 in descending order of influence degrees, and outputs the IDs.

The display device 600 displays, to the user or the like, the factor candidate output from the factor analysis device 400 (step S204).

Figures 12, 13:
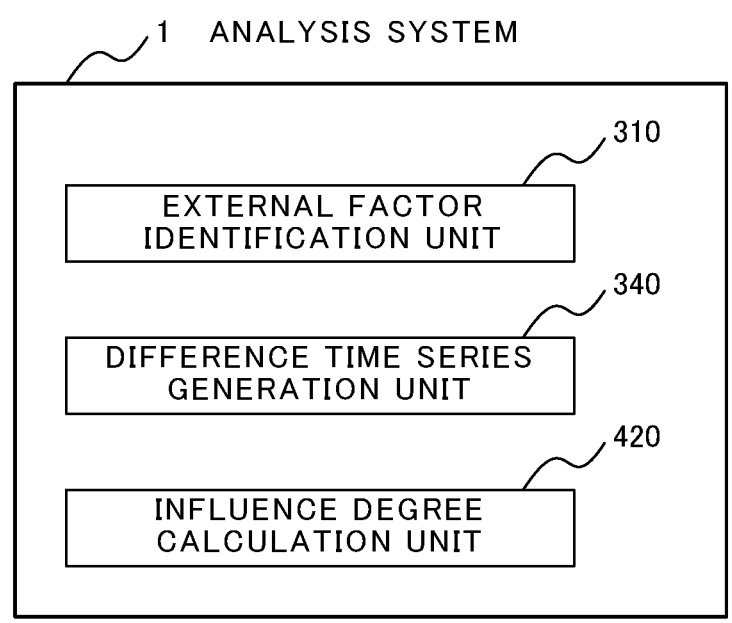
FIG. 12 is a diagram illustrating an example of a display screen displayed by a display device 600 according to the first example embodiment.
FIG. 13 is a block diagram illustrating a characteristic configuration according to the first example embodiment.

FIG. 12 is a diagram illustrating an example of a display screen displayed by the display device 600 according to the first example embodiment. In the example of FIG. 12, the IDs "2", "9", and "8" of the explanatory time series received from the factor candidate output unit 440 are displayed as factor candidates together with influence degrees in descending order of the influence degrees.

For example, the display device 600 displays the display screen as in FIG. 12.

Thereby, the user or the like can recognize a candidate of an explanatory time series having an influence on a value change of an objective time series.

The control device 700 controls the analysis subject device 900, based on the factor candidate output from the factor analysis device 400 (step S205). Herein, the control device 700 may control the analysis subject device 900, for example, by use of a value (a value in normal time) of each item of a manufacturing condition, being previously stored in a non-illustrated storage unit, when a value of an item of a quality index is normal. In this case, the control device 700 may control the analysis subject device 900 in such a way that a value of an item of a manufacturing condition relevant to an explanatory time series being a factor candidate becomes a value in normal time.

For example, the control device 700 controls the analysis subject device 900 in such a way that a value of an item of a manufacturing condition relevant to the explanatory time series of each of the IDs "2", "9", and "8" becomes a value in normal time.

Accordingly, the operation according to the first example embodiment is completed.

Next, a characteristic configuration according to the first example embodiment is described.

FIG. 13 is a block diagram illustrating the characteristic configuration according to the first example embodiment.

Referring to FIG. 13, the analysis system 1 includes the external factor identification unit 310 (identification unit), the difference time series generation unit 340, and the influence degree calculation unit 420. The external factor identification unit 310 identifies a first explanatory time series (external factor time series) among a plurality of explanatory time series. The difference time series generation unit 340 generates a difference time series between a value of an objective time series and a prediction value of the objective time series calculated based on a value of the first explanatory time series. The influence degree calculation unit 420 calculates, based on one or more second explanatory time series (explanatory time series other than an external factor time series) among the plurality of explanatory time series and the difference time series, an influence degree of each of the one or more second explanatory time series on a value change of the difference time series.

Next, an advantageous effect of the first example embodiment is described.

According to the first example embodiment, a factor, other than an external factor, having an influence on a state change of a system can be correctly identified even when an external factor having a strong correlation with the state change of the system exists. A reason for this is that the analysis system 1 generates a difference time series between a value of an objective time series and a prediction value of the objective time series calculated based on a value of the first explanatory time series, and calculates an influence degree of each of second explanatory time series on a value change of the difference time series.

According to the first example embodiment, a factor, other than an external factor, having an influence on a state change of a system can be easily recognized. A reason for this is that the analysis system 1 extracts a candidate of an explanatory time series having an influence on a value change of an objective time series, based on an influence degree of each of the second explanatory time series, and outputs the candidate.

According to the first example embodiment, a factor, other than an external factor, having an influence on a state change of a system can be correctly recognized even when an external factor is not designated. A reason for this is that the analysis system 1 identifies, as a first explanatory time series, an explanatory time series that influences a value change of an objective time series, and that is not influenced by a value change of an objective time series.

Second Example Embodiment

A second example embodiment is different from the first example embodiment in that, in factor extraction processing, an explanatory time series being a factor candidate is identified by use of, instead of an explanatory time series, a feature time series being a time series of a feature quantity extracted from among explanatory time series.

First, a configuration according to the second example embodiment is described.

Figure 14:
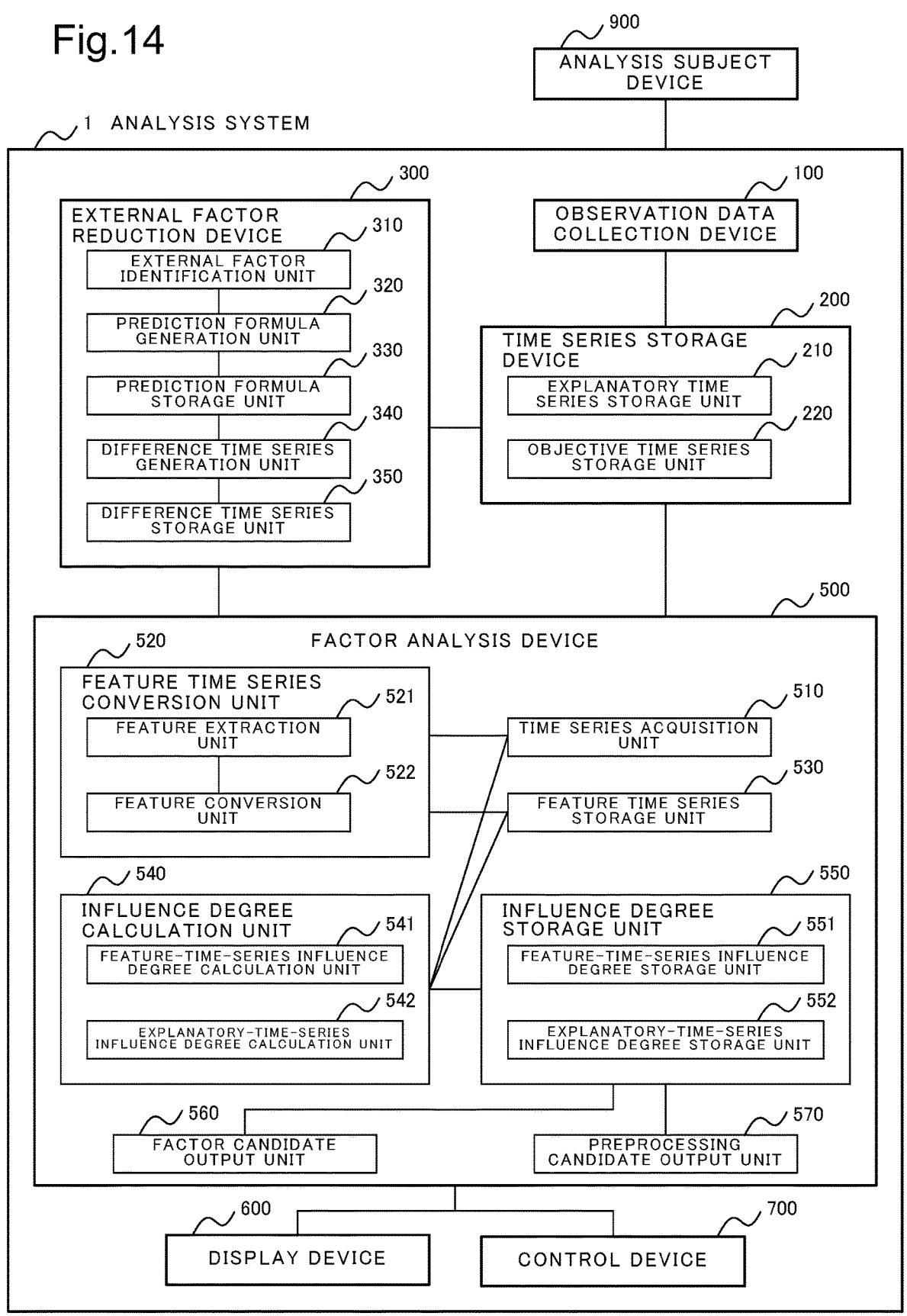
FIG. 14 is a block diagram illustrating a configuration of an analysis system 1 according to a second example embodiment.

FIG. 14 is a block diagram illustrating a configuration of an analysis system 1 according to the second example embodiment. Referring to FIG. 14, in the analysis system 1 according to the second example embodiment, the factor analysis device 400 according to the first example embodiment is replaced with a factor analysis device 500.

The factor analysis device 500 extracts an explanatory time series being a factor candidate in a way similar to that of a factor analysis device in PTL 3. The factor analysis device 500 identifies an explanatory time series being a factor candidate by use of a difference time series instead of an objective time series used in the factor analysis device in PTL 3.

The factor analysis device 500 includes a time series acquisition unit 510, a feature time series conversion unit 520, a feature time series storage unit 530, an influence degree calculation unit 540, an influence degree storage unit 550, a factor candidate output unit 560, and a preprocessing candidate output unit 570.

The time series acquisition unit 510 acquires explanatory time series other than an external factor time series from a time series storage device 200, and a difference time series from a difference time series storage unit 350 of an external factor reduction device 300, as in the time series acquisition unit 410 according to the first example embodiment.

The feature time series conversion unit 520 extracts a feature quantity from explanatory time series other than an external factor time series, and converts the feature quantity into a feature time series, as in a feature time series conversion unit in PTL 3. The feature time series conversion unit 520 includes a feature extraction unit 521 and a feature conversion unit 522. The feature extraction unit 521 extracts a feature quantity from the explanatory time series acquired by the time series acquisition unit 510. The feature conversion unit 522 generates a feature time series, based on the feature quantity extracted by the feature extraction unit 521.

The feature time series storage unit 530 stores the feature time series generated by the feature time series conversion unit 520.

The influence degree calculation unit 540 calculates an influence degree of an explanatory time series on a value change of the difference time series, as in an influence degree calculation unit in PTL 3. The influence degree calculation unit 540 includes a feature-time-series influence degree calculation unit 541 and an explanatory-time-series influence degree calculation unit 542. The feature-time-series influence degree calculation unit 541 calculates an influence degree of a feature time series on a difference time series. The explanatory-time-series influence degree calculation unit 542 calculates an influence degree of an explanatory time series other than an external factor time series on a difference time series, based on an influence degree of a feature time series.

The influence degree storage unit 550 stores an influence degree of a feature time series and an influence degree of an explanatory time series calculated by the influence degree calculation unit 540, as in an influence degree storage unit in PTL 3. The influence degree storage unit 550 includes a feature-time-series influence degree storage unit 551 and an explanatory-time-series influence degree storage unit 552. The feature-time-series influence degree storage unit 551 stores an influence degree of a feature time series. The explanatory-time-series influence degree storage unit 552 stores an influence degree of an explanatory time series.

The factor candidate output unit 560 (hereinafter, also described as a first output unit) extracts an explanatory time series being a factor candidate, based on an influence degree of an explanatory time series, and outputs the explanatory time series to a display device 600 and a control device 700, as in a factor output unit in PTL 3.

The preprocessing candidate output unit 570 (hereinafter, also described as a second output unit) extracts, based on an influence degree of a feature time series, a candidate (hereinafter, also described as a preprocessing candidate) of a kind of feature quantity to be calculated as preprocessing, and outputs the candidate to the display device 600, as in the factor output unit in PTL 3.

The factor analysis device 500 may be a computer including a CPU and a recording medium storing a program, and operating by control based on the program, as in the factor analysis device 400 according to the first example embodiment.

Next, an operation of the analysis system 1 according to the second example embodiment is described.

Herein, it is assumed that, as in a specific example according to the first example embodiment, an explanatory time series and an objective time series in an analysis target period as in FIGS. 2 and 3 collected by an observation data collection device 100 are saved in the time series storage device 200.

External factor reduction processing according to the second example embodiment is similar to external factor reduction processing according to the first example embodiment.

Herein, it is assumed that, as in the specific example according to the first example embodiment, an explanatory time series having an ID "1" is identified as an external factor time series by the external factor reduction processing, and a difference time series as in FIG. 8 is saved in the difference time series storage unit 350.

The factor extraction processing according to the second example embodiment is described below.

Figure 15:
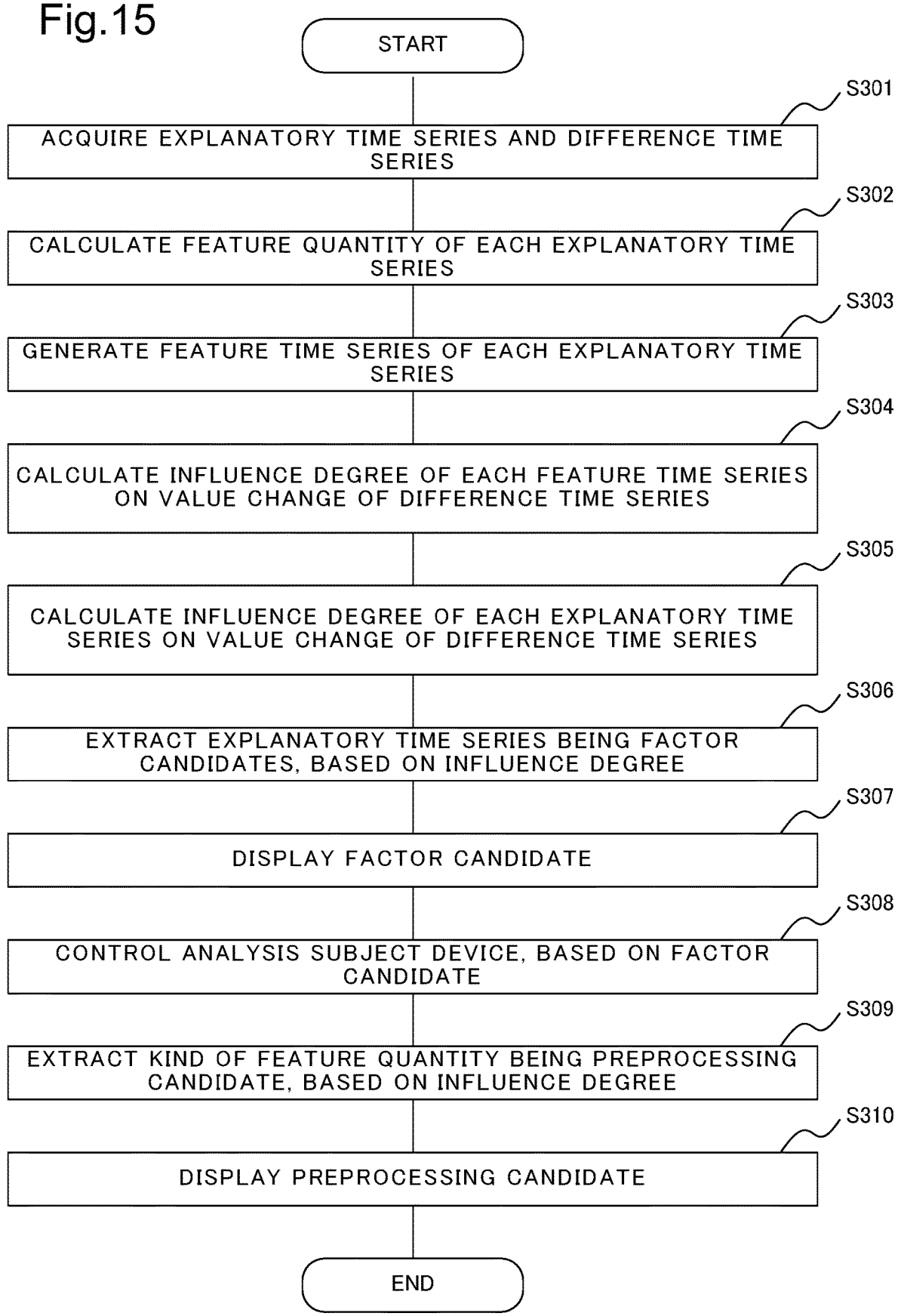
FIG. 15 is a flowchart illustrating factor extraction processing according to the second example embodiment.

FIG. 15 is a flowchart illustrating the factor extraction processing according to the second example embodiment.

First, the time series acquisition unit 510 of the factor analysis device 500 acquires explanatory time series other than an external factor time series from the time series storage device 200, and acquires a difference time series from the external factor reduction device 300 (step S301).

The feature extraction unit 521 of the feature time series conversion unit 520 extracts a feature quantity at each time, for each of the explanatory time series other than the external factor time series (step S302). Herein, the feature extraction unit 521 extracts, for each of the explanatory time series, a feature quantity of each of one or more kinds by use of a partial time series (within a range of a "window") for a predetermined time width from each time. For example, a statistic of an average, distribution, or the like is used as a kind of feature quantity. An auto-regression coefficient, a frequency distribution, or a coefficient of correlation with another explanatory time series may be used as a kind of feature quantity. The feature extraction unit 521 may repeat extraction of a feature quantity at each time while shifting the window from a start time of an explanatory time series toward an end time by a predetermined number of time points, until the window reaches the end time.

The feature conversion unit 522 generates a feature time series from the extracted feature quantity, for each of the explanatory time series other than the external factor time series (step S303). Herein, the feature conversion unit 522 generates a feature time series by arranging the feature quantity at each time extracted by the feature extraction unit 521 in an order of time, for each kind of feature quantity with regard to each explanatory time series. The feature conversion unit 522 saves the generated feature time series in the feature time series storage unit 530.

FIG. 16 is a diagram illustrating an example of a feature time series according to the second example embodiment. For example, the feature time series conversion unit 520 generates a feature time series as in FIG. 16 for each kind ("a", "b", . . . ) of feature quantity with regard to each of the explanatory time series (IDs "2", . . . , and "N") other than the external factor time series in FIG. 2. In the example of FIG. 16, each feature time series is given a label with which an explanatory time series of a generation source of the feature time series and a kind of feature quantity are identifiable. For example, a label "a::2" is given to a feature time series generated for a kind "a" of feature quantity with regard to the explanatory time series having an ID "2".

The feature-time-series influence degree calculation unit 541 of the influence degree calculation unit 540 calculates an influence degree on a value change of the difference time series, for each of the feature time series (step S304). Herein, the feature-time-series influence degree calculation unit 541 calculates an influence degree of a feature time series by use of, for example, a multivariate analysis technique similar to the multivariate analysis technique used in the external factor identification processing described above. The feature-time-series influence degree calculation unit 541 calculates an influence degree of a feature time series by executing a multivariate analysis in which a difference time series is defined as an objective variable, and each feature time series is defined as an explanatory variable, for each of one or more multivariate analysis techniques. The feature-time-series influence degree calculation unit 541 saves a calculation result of the influence degree of the feature time series in the feature-time-series influence degree storage unit 551. An influence degree of a feature time series is normalized in such a way that a maximum value becomes 1 and a minimum value becomes 0, for example.

FIG. 17 is a diagram illustrating a calculation example of an influence degree of a feature time series according to the second example embodiment. For example, the feature-time-series influence degree calculation unit 541 executes a multivariate analysis in which a difference time series in FIG. 8 is defined as an objective variable, and each explanatory time series in FIG. 16 is defined as an explanatory variable, for each of multivariate analysis techniques "technique I", "technique II" and "technique III". Thereby, the feature-time-series influence degree calculation unit 541 calculates an influence degree of each feature time series, as in FIG. 17. In the example of FIG. 17, the feature time series are illustrated in descending order of calculated influence degrees.

The explanatory-time-series influence degree calculation unit 542 calculates an influence degree on a value change of the difference time series, for each of the explanatory time series other than the external factor time series, based on an influence degree of each feature time series (step S305). Herein, the explanatory-time-series influence degree calculation unit 542 calculates an influence degree of an explanatory time series by calculating a sum of influence degrees of feature time series calculated for one or more kinds for each of the explanatory time series with regard to each of one or more multivariate analysis techniques, for example. Targets for which a sum is calculated may be all kinds of feature time series calculated for a plurality of explanatory time series, or may be a predetermined number of kinds of feature time series starting from the highest influence degree. The explanatory-time-series influence degree calculation unit 542 saves a calculation result of the influence degree of the explanatory time series in the explanatory-time-series influence degree storage unit 552.

FIG. 18 is a diagram illustrating a calculation example of an influence degree of an explanatory time series according to the second example embodiment. For example, the explanatory-time-series influence degree calculation unit 542 calculates, as in FIG. 18, an influence degree of each of the explanatory time series (IDs "2", . . . , and "N") by use of the influence degree of the feature time series in FIG. 17, for each of the multivariate analysis techniques "technique I", "technique II" and "technique III". In the example of FIG. 18, the feature time series are illustrated in descending order of calculated influence degrees.

The factor candidate output unit 560 extracts, from the explanatory-time-series influence degree storage unit 552, an explanatory time series being a factor candidate, based on an influence degree of a feature time series, and outputs the explanatory time series to the display device 600 and the control device 700 (step S306). Herein, the factor candidate output unit 560 integrates influence degrees of explanatory time series, for example, by deriving, for each of the explanatory time series, a sum of influence degrees of explanatory time series calculated for one or more multivariate analysis techniques. As a sum of influence degrees, a simple sum of influence degrees for each of the multivariate analysis techniques may be calculated, or a sum of influence degrees weighted by a predetermined weight for each of the multivariate analysis techniques may be calculated. The factor candidate output unit 560 extracts, as explanatory time series being factor candidates, a predetermined number of explanatory time series in descending order of integrated influence degrees, and outputs IDs of the explanatory time series together with the influence degrees. The factor candidate output unit 560 may extract explanatory time series of which integrated influence degrees are equal to or more than a predetermined value.

FIG. 19 is a diagram illustrating an integration example of influence degrees of explanatory time series according to the second example embodiment. For example, the factor candidate output unit 560 integrates influence degrees of a plurality of explanatory time series in FIG. 18, as in FIG. 19. In the example of FIG. 19, explanatory time series are illustrated in descending order of the integrated influence degrees. The factor candidate output unit 560 extracts IDs "13" and "37" of explanatory time series of which integrated influence degrees are equal to or more than 1, and outputs the IDs as factor candidates, for example.

The display device 600 displays, to a user or the like, factor candidate output from the factor analysis device 500 (step S307).

FIG. 20 is a diagram illustrating an example of a display screen displayed by the display device 600 according to the second example embodiment. In the example of FIG. 20, the IDs "13" and "37" of the explanatory time series received from the factor candidate output unit 560 are displayed as factor candidates together with influence degrees in descending order of the influence degrees.

For example, the display device 600 displays the display screen as in FIG. 20.

Thereby, the user or the like can recognize a candidate of an explanatory time series having an influence on a value change of an objective time series.

The control device 700 controls an analysis subject device 900, based on the factor candidate output from the factor analysis device 500 (step S308).

For example, the control device 700 controls the analysis subject device 900 in such a way that a value of an item of a manufacturing condition relevant to the explanatory time series of each of the IDs "13" and "37" becomes a value in normal time.

Furthermore, the preprocessing candidate output unit 570 extracts, from the feature-time-series influence degree calculation unit 541, a kind of feature quantity being a preprocessing candidate, based on an influence degree of a feature time series, and outputs the kind to the display device 600 (step S309). Herein, the preprocessing candidate output unit 570 extracts, as a preprocessing candidate, a kind of feature quantity of a feature time series having a high influence degree in a calculation result of the influence degree of the feature time series, for example.

For example, the preprocessing candidate output unit 570 extracts, as preprocessing candidates, a kind "a" of feature quantity of a feature time series "a::13" and a feature time series "a::37" having a high influence degree, from the calculation result of the influence degree of the explanatory time series in FIG. 17.

The display device 600 displays, to the user or the like, the preprocessing candidate output from the factor analysis device 500 (step S310).

FIG. 21 is a diagram illustrating another example of a display screen displayed by the display device 600 according to the second example embodiment. In the example of FIG. 21, the kind "a" of feature quantity received from the preprocessing candidate output unit 570 is displayed as a preprocessing candidate.

For example, the display device 600 displays the display screen as in FIG. 21.

Thereby, the user or the like can recognize appropriate preprocessing to be performed for an explanatory time series (a kind of feature quantity to be calculated as preprocessing).

Accordingly, the operation according to the second example embodiment is completed.

Next, a characteristic configuration according to the second example embodiment is described.

Figure 22:
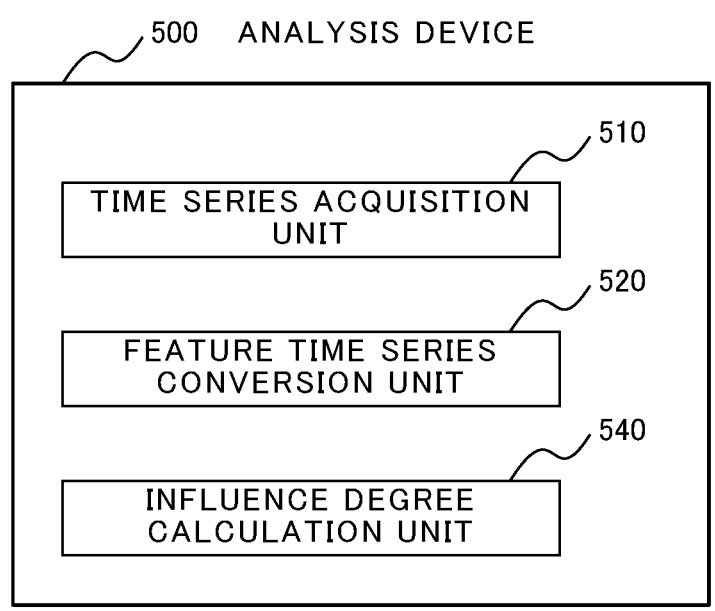
FIG. 22 is a block diagram illustrating a characteristic configuration according to the second example embodiment.

FIG. 22 is a block diagram illustrating a characteristic configuration according to the second example embodiment.

Referring to FIG. 22, the factor analysis device 500 includes the time series acquisition unit 510, the feature time series conversion unit 520, and the influence degree calculation unit 540. The time series acquisition unit 510 acquires a difference time series between a prediction value of an objective time series generated based on a value of a first explanatory time series (external factor time series) among a plurality of explanatory time series and a value of the objective time series, and second explanatory time series (explanatory time series other than the external factor time series). For each of the second explanatory time series, the feature time series conversion unit 520 extracts a feature quantity from the second explanatory time series, and converts the feature quantity into a feature time series. The influence degree calculation unit 540 calculates an influence degree of each of the second explanatory time series on a value change of the difference time series, based on the feature time series of the second explanatory time series, and the difference time series.

Next, an advantageous effect of the second example embodiment is described.

According to the second example embodiment, a factor, other than an external factor, having an influence on a state change of a system can be correctly recognized even when an external factor having a strong correlation with the state change of the system exists and preprocessing is required for a time series being an analysis target. A reason for this is that the factor analysis device 500 extracts a feature quantity from second explanatory time series, converts the feature quantity into a feature time series, and calculates an influence degree of each of the second explanatory time series on a value change of a difference time series, based on the feature time series and the difference time series. Herein, the difference time series is a difference time series between a value of an objective time series and a prediction value of the objective time series generated based on a value of a first explanatory time series.

According to the second example embodiment, a factor, other than an external factor, having an influence on a state change of a system can be easily recognized. A reason for this is that the factor analysis device 500 extracts a candidate of an explanatory time series having an influence on a value change of an objective time series, based on an influence degree of each of the second explanatory time series, and outputs the candidate.

According to the second example embodiment, a factor, other than an external factor, having an influence on a state change of a system can be correctly identified even when an external factor is not designated. A reason for this is that the factor analysis device 500 uses a difference time series generated based on a first explanatory time series being an explanatory time series that influences a value change of an objective time series, and that is not influenced by a value change of an objective time series.

According to the second example embodiment, appropriate preprocessing to be performed for an explanatory time series can be recognized. A reason for this is that the factor analysis device 500 extracts a kind of feature quantity to be extracted from second explanatory time series, based on an influence degree of one or more kinds of feature time series of each of the second explanatory time series, and outputs the kind.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, in each of the example embodiments described above, a case where a system being an analysis target is a manufacturing system, and the analysis subject device 900 is a device used in a manufacturing processing is described as an example. However, a system being an analysis target may be another system as long as values of various items pertaining to an operation of the system can be acquired as values of items of the analysis target.

For example, a system being an analysis target may be an information technology (IT) system, a plant system, a power generation system, a structure, or transport equipment. When a system being an analysis target is an IT system, a time series of a power consumption quantity, the number of calculations, or the like is used as an objective time series, for example. A use rate or a use quantity of a computer resource such as a CPU use rate, a memory use rate, or a disk access frequency, or a use rate or a use quantity of a communication network resource is used as an explanatory time series.

In each of the example embodiments described above, a case where the number of external factor time series to be identified by the external factor reduction device 300 is 1 is described as an example. However, the number of external factor time series to be identified may be a plural number. In this case, in external factor reduction processing, a prediction formula for predicting a value of an objective time series from values of a plurality of external factor time series is generated by, for example, a regression analysis, and a difference time series is generated based on the prediction formula.

In each of the example embodiments described above, a case where the number of objective time series is 1 is described as an example. However, the number of objective time series may be a plural number. In this case, in external factor reduction processing, an external factor time series is identified for each of a plurality of objective time series, and a difference time series is generated, for example. In factor extraction processing, an influence degree of an explanatory time series other than the external factor time series is calculated for each of a plurality of difference time series, and an explanatory time series being a factor candidate is extracted.

In external factor identification processing or factor extraction processing, an L1 regularized logistic regression described in NPL 1, or a random forest classifier described in NPL 2 may be used as a multivariate analysis technique.

REFERENCE SIGNS LIST

1 Analysis system
100 Observation data collection device
200 Time series storage device
210 Explanatory time series storage unit
220 Objective time series storage unit
300 External factor reduction device
310 External factor identification unit
320 Prediction formula generation unit
330 Prediction formula storage unit
340 Difference time series generation unit
350 Difference time series storage unit
301 CPU
302 Storage device
303 Input/output device
304 Communication device
400 Factor analysis device
401 CPU
402 Storage device
403 Input/output device
404 Communication device
410 Time series acquisition unit
420 Influence degree calculation unit
430 Influence degree storage unit
440 Factor candidate output unit
500 Factor analysis device
510 Time series acquisition unit
520 Feature time series conversion unit
521 Feature extraction unit
522 Feature conversion unit
530 Feature time series storage unit
540 Influence degree calculation unit
541 Feature-time-series influence degree calculation unit
542 Explanatory-time-series influence degree calculation unit
550 Influence degree storage unit
551 Feature-time-series influence degree storage unit
552 Explanatory-time-series influence degree storage unit
560 Factor candidate output unit
570 Preprocessing candidate output unit
600 Display device
700 Control device
900 Analysis subject device

The invention claimed is:
1. An analysis system comprising:
a memory storing instructions; and
one or more processors configured to execute the instructions to perform external factor reduction processing, the external factor reduction processing comprising:
acquiring time series of observation values of an analysis subject device as an objective time series and a plurality of explanatory time series;
identifying an external factor time series among the plurality of explanatory time series;
calculating a prediction value of the objective time series calculated based on a value of the external factor time series; and
generating a difference time series between a value of the objective time series and the prediction value of the objective time series by calculating a difference between the prediction value and an observation value of the objective time series at each time in the analysis target period,
wherein the one or more processors are further configured to execute the instructions to:
calculate an influence degree of each of one or more explanatory time series other than the external factor time series on a value change of the difference time series by executing a multivariate analysis technique, wherein the difference time series is defined as an objective variable, and the one or more explanatory time series other than the external factor time series is defined as an explanatory variable in the multivariate analysis technique;

extract a candidate of an explanatory time series influencing a value change of the objective time series from the one or more explanatory time series other than the external factor time series, based on the influence degree of each of the one or more explanatory time series other than the external factor time series;

output the extracted candidate; and control the analysis subject device based on the output extracted candidate, wherein the observation values of the analysis subject are time series of a quality index or a manufacturing condition of a manufactured product, wherein the quality index includes one of conductivity of the manufactured product, water resistance of the manufactured product, heat resistance of the manufactured product, or a product condition indicating whether the manufactured product normally operates, wherein the manufacturing condition includes one of temperature, pressure, a gas flow volume, voltage, a property of a material, an amount or ratio of a material, an operation status indicating whether a specific operation is performed, atmospheric temperature, atmospheric pressure, or weather, and wherein the external factor reduction processing is executed when an abnormality is found in a value of the quality index.

2. The analysis system according to claim 1, wherein the one or more processors are configured to further execute the instructions to:

output the extracted candidate to a control device of the analysis subject device, wherein the extracted candidate is a factor that influences on a state change of the analysis subject device other than an external factor.

3. The analysis system according to claim 1, wherein the one or more processors are configured to execute the instructions to:

when identifying the external factor time series, identify, as the external factor time series, an explanatory time series that influences a value change of the objective time series, and that is not influenced by a value change of the objective time series, among the plurality of explanatory time series.

4. The analysis system according to claim 3, wherein the one or more processors are configured to execute the instructions to:

when identifying the external factor time series, extract one or more candidates of the external factor time series from among the plurality of explanatory time series, based on an influence degree of each of the plurality of explanatory time series on a value change of the objective time series, and identify the external factor time series from the one or more candidates of the external factor time series, based on a value change of each of the one or more candidates of the external factor time series resulting from a value change of the objective time series.

5. The analysis system according to claim 1, wherein the one or more processors are configured to further execute the instructions to:

generate a prediction formula for predicting the prediction value of the objective time series from the value of the external factor time series, wherein, when generating the difference time series, generate the difference time series between the value of the objective time series, and the prediction value of the objective time series calculated by substituting the value of the external factor time series for the prediction formula.

6. An analysis method comprising:

external factor reduction processing comprising:

acquiring time series of observation values of an analysis subject device as an objective time series and a plurality of explanatory time series;

identifying an external factor time series among a plurality of explanatory time series;

calculating a prediction value of the objective time series calculated based on a value of the external factor time series; and generating a difference time series between a value of the objective time series and the prediction value of the objective time series by calculating a difference between the prediction value and an observation value of the objective time series at each time in the analysis target period, wherein the analysis method further comprises:

calculating an influence degree of each of one or more explanatory time series other than the external factor time series on a value change of the difference time series by executing a multivariate analysis technique, wherein the difference time series is defined as an objective variable, and the one or more explanatory time series other than the external factor time series is defined as an explanatory variable in the multivariate analysis technique;

extracting a candidate of an explanatory time series influencing a value change of the objective time series from the one or more explanatory time series other than the external factor time series, based on an influence degree of each of the one or more explanatory time series other than the external factor time series;

outputting the extracted candidate; and controlling the analysis subject device based on the output extracted candidate, wherein the observation values of the analysis subject are time series of a quality index or a manufacturing condition of a manufactured product, wherein the quality index includes one of conductivity of the manufactured product, water resistance of the manufactured product, heat resistance of the manufactured product, or a product condition indicating whether the manufactured product normally operates, wherein the manufacturing condition includes one of temperature, pressure, a gas flow volume, voltage, a property of a material, an amount or ratio of a material, an operation status indicating whether a specific operation is performed, atmospheric temperature, atmospheric pressure, or weather, and wherein the external factor reduction processing is executed when an abnormality is found in a value of the quality index.

7. The analysis method according to claim 6, further comprising outputting the extracted candidate to a control device of the analysis subject device, wherein the extracted candidate is a factor that influences on a state change of the analysis subject device other than an external factor.

8. The analysis method according to claim 6, further comprising,
when identifying the external factor time series, identifying, as the external factor time series, an explanatory time series that influences a value change of the objective time series, and that is not influenced by a value change of the objective time series, among the plurality of explanatory time series.

9. The analysis method according to claim 8, further comprising,
when identifying the external factor time series, extracting one or more candidates of the external factor time series from among the plurality of explanatory time series, based on an influence degree of each of the plurality of explanatory time series on a value change of the objective time series, and identifying the external factor time series from the one or more candidates of the external factor time series, based on a value change of each of the one or more candidates of the external factor time series resulting from a value change of the objective time series.

10. A non-transitory recording medium storing a program that causes a computer to execute processing of:
external factor reduction processing comprising:
acquiring time series of observation values of an analysis subject device as an objective time series and a plurality of explanatory time series;
identifying an external factor time series among the plurality of explanatory time series;
calculating a prediction value of the objective time series calculated based on a value of the external factor time series; and
generating a difference time series between a value of the objective time series and a prediction value of the objective time series by calculating a difference between the prediction value and an observation value of the objective time series at each time in the analysis target period,
wherein the program further causes the computer to execute processing of: calculating an influence degree of each of the one or more explanatory time series other than the external factor time series on a value change of the difference time series by executing a multivariate analysis technique, wherein the difference time series is defined as an objective variable, and the one or more explanatory time series other than the external factor time series is defined as an explanatory variable in the multivariate analysis technique;
extracting a candidate of an explanatory time series influencing a value change of the objective time series from the one or more explanatory time series other than the external factor time series, based on an influence degree of each of the one or more second explanatory time series;
outputting the extracted candidate; and
controlling the analysis subject device based on the output extracted candidate,
wherein the observation values of the analysis subject are time series of a quality index or a manufacturing condition of a manufactured product,
wherein the quality index includes one of conductivity of the manufactured product, water resistance of the manufactured product, heat resistance of the manufactured product, or a product condition indicating whether the manufactured product normally operates,
wherein the manufacturing condition includes one of temperature, pressure, a gas flow volume, voltage, a property of a material, an amount or ratio of a material, an operation status indicating whether a specific operation is performed, atmospheric temperature, atmospheric pressure, or weather, and
wherein the external factor reduction processing is executed when an abnormality is found in a value of the quality index.

* * * * *